W. J. PHELPS.
PROCESS OF CANNING LIQUIDS.
APPLICATION FILED JAN. 6, 1912.

1,101,656.

Patented June 30, 1914.

WITNESSES
Howard D. Orr.
F. T. Chapman.

Walter J. Phelps, INVENTOR,
BY
ATTORNEY

UNITED STATES PATENT OFFICE.

WALTER J. PHELPS, OF BALTIMORE, MARYLAND, ASSIGNOR, BY DIRECT AND MESNE ASSIGNMENTS, TO PHELPS CAN COMPANY, OF BALTIMORE, MARYLAND, A CORPORATION OF WEST VIRGINIA.

PROCESS OF CANNING LIQUIDS.

1,101,656.  Specification of Letters Patent.  Patented June 30, 1914.

Application filed January 6, 1912. Serial No. 669,886.

*To all whom it may concern:*

Be it known that I, WALTER J. PHELPS, a citizen of the United States, residing at Baltimore, State of Maryland, have invented a new and useful Process of Canning Liquids, of which the following is a specification.

This invention has reference to improvements in the process of canning liquids and especially for canning evaporated milk, and its object is to provide a means whereby cans completely sealed with the exception of a small filling orifice in one head may be expeditiously filled with evaporated milk or similar substance, the invention being particularly adapted for the material known commercially as evaporated milk, and for simplicity of description such substance will be referred to exclusively with the understanding, however, that the invention is applicable to other substances.

By the present invention evaporated milk is introduced into the cans while the latter are in the inverted position, that is, with the head containing the small perforation downward, and the imperforate head upward, the milk on entering the can spreading out toward the side walls thereof, and as the level of the milk within the can rises the entering stream is forced into a constantly increasing body of milk, while the air within the can is either exhausted therefrom by suitable suction apparatus, or is forced therefrom by the inflowing milk, the mode of causing the flow of milk into the can by atmospheric pressure because of the production within the can of sub-atmospheric pressure by suction apparatus, being the preferable mode, since it presents certain advantages to be hereinafter referred to.

The invention will be best understood from a consideration of the following detailed description taken in connection with the accompanying drawings forming a part of this specification, with the understanding that while the drawings show certain apparatus for the practice of the invention, the latter may be practised with other apparatus of simpler or more complex construction, and that while with the apparatus shown the steps of the process follow a certain course, the order of the steps of the process is not necessarily that which would follow from the use of the particular apparatus disclosed.

Evaporated milk is a liquid of considerably thicker consistency than milk in its ordinary form, since about fifty per cent. of the water of ordinary milk has been driven off. It is customary to package such milk in sealed tin cans which in the smaller sizes are usually of three different capacities. The smallest can used commercially is that known in the trade as the baby can, which is about two and one-half inches long and about two and one-half inches in diameter. The largest of the smaller type of cans are known as tall cans, while the intermediate cans are known as family cans. It is advantageous for manufacturing reasons that cans of the sizes referred to should be made complete including the body and heads with all joints soldered prior to the introduction of the milk thereinto, and each can is provided with a single small filling perforation centrally located in one head, the other head being imperforate. The complete sealing of the can, with the exception of the small filling perforation, before the milk is introduced greatly facilitates the final sealing, since this may be performed by the application of a small drop of solder and, moreover, the cost of the soldering operation is correspondingly decreased on account of the small quantity of solder necessitated and the almost total elimination of any liability of leaks.

It has been proposed prior to the present invention to fill cans with liquid through a single small filling perforation, but the prior methods always contemplate the filling of the cans while the latter are in the upright position, that is, with the filling perforation uppermost and the milk or other liquid is caused to flow into the can in a stream directed downwardly into the can. Practice has demonstrated that this method is open to two serious objections. The milk entering the can in a small stream will either flow thereinto at such a slow rate as to inordinately prolong the filling operation, or if sufficient pressure be applied to the milk to cause so rapid a flow thereof into the can as to reduce the time of filling to workable limits, there is a great liability of the milk foaming, which has the effect of either preventing the introduction into the can of the requisite quantity of milk or prolonging the filling operation despite the increased flow of milk. Of course, the filling perforation may be made comparatively large, but the enlarging of the filling perforation causes material difficulties in the soldering operation.

By the present invention the time of filling is reduced to workable limits and the final sealing of the can by a single small drop of solder is rendered possible without liability of any solder entering the can in the form of shot.

Figures 1, 2, 3:
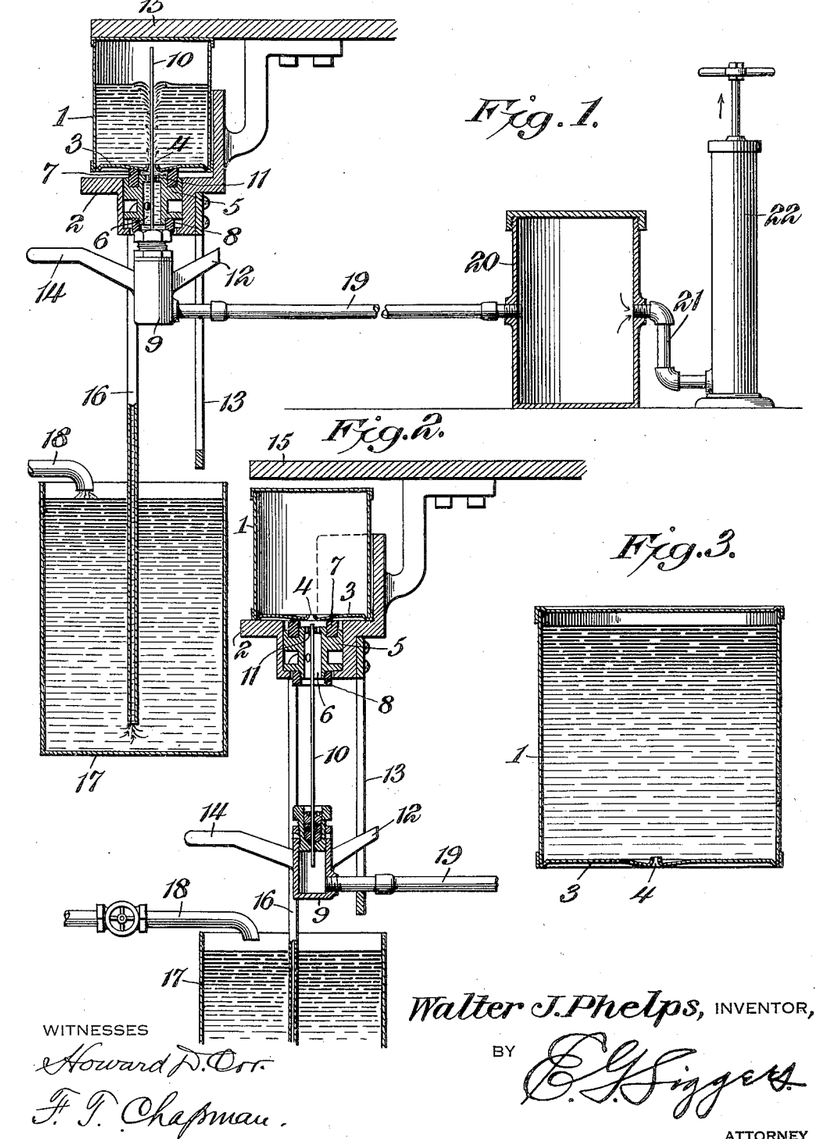
Figure 1 is a view partially in section and partially in elevation of an apparatus capable of use in practising the invention, wherein sub-atmospheric pressure is established within the can to cause the flow of milk thereinto, the parts being shown in the active position.
Fig. 2 is a view of a part of the apparatus shown in Fig. 1, but indicating another phase of the operation.
Fig. 3 is a sectional view of a filled can while still in the inverted position.

In Figs. 1, 2 and 3 there is shown a can 1, such as is customarily made of tin, the can shown in Fig. 3 being proportioned similar to the baby can of commerce. In order to sustain the can there is shown in Figs. 1 and 2 a support 2 upon which the can may be placed in the inverted position with its perforated head downward, the can having produced in one head 3 a central small perforation 4. The support 2 is provided with a block 5 having a central passage 6 therethrough and at the ends of the passage the block 5 carries annular gaskets 7, 8, respectively, these gaskets being customarily made of rubber. Movable into and out of engagement with the gasket 8 is a chambered member 9 carrying a tube 10 extending through the passage 6 and a guide 11 at the end of the passage surrounded by the gasket 7, this guide positioning the tube so that when the member 9 is moved into engagement with the gasket 8 the tube will enter a can 1 upon the support 2 through the perforation 4 and will extend into close relation to the imperforate head of the can. The chambered member 9 is shown as provided with a guide arm 12 movable in a slot in a guide member 13, and the chambered member 9 is also provided with another arm 14 by means of which the member is moved into and out of engagement with the gasket 8. The support 2 is overhung by a stop member 15 which is engaged by the can 1 when the member 9 is brought into engagement with the gasket 8, thereby lifting the block 5, which is movable in the support 2 until the can which participates in the rising movement of the block 5 is in engagement with the stop member 15, further movement of the member 9 compressing the two gaskets 7 and 8, so that they form air tight connections with the perforated head of the can about the perforation 4 and with the member 9, respectively. The block 5 carries a tube 16 opening at one end into the passage 6 and of sufficient length to extend into a reservoir 17 at the other end, which reservoir is designed to contain a suitable quantity of milk replenished from time to time, or constantly if need be from a suitable source of supply through a pipe 18. The interior of the chambered member 9 communicates by means of a pipe 19 with a receptacle 20 which in turn communicates by way of a pipe or conduit 21 with an air pump 22, shown in the drawings as a hand pump, designed to produce sub-atmospheric pressure within the receptacle 20, thus causing a flow of air toward the receptacle 20 by way of the pipe 19, chambered member 9 and tube 10. An apparatus such as described and illustrated in Figs. 1 and 2 may be operated to carry out the present invention.

When the parts are positioned as shown in Fig. 2, a can 1 is placed in the inverted position upon the support 2, which latter may be suitably shaped to center the can with relation to the tube 10, which at this stage of the operation has its free end withdrawn from interference with the placing of the can upon the support 2. Now the chambered member 9 is moved toward the can until the tube 10 is introduced into the can through the perforation 4 and the chambered member is brought into engagement with the gasket 8, thereby lifting the block 5 until the gasket 7 engages the perforated head of the can about the perforation 4 and the can is lifted until its further movement is arrested by engagement with the stop 15 when an additional movement of the chambered member 9 causes a sufficient compression of the gaskets 7 and 8 to render their engagement with the can and chambered member air tight for the pressures employed. The chambered member 9 may be moved in the active direction either by the operator grasping the arm 14 or the latter may be actuated by some suitable mechanism. The air exhausting means 22 may now be started in operation, or it may have been previously started in operation and air is exhausted from the interior of the can, flowing by way of the tube 10, chambered member 9, and pipe 19 into the receptacle 20, and from thence by the pipe 21 to the exhaust pump 22. There is thereby produced a condition of sub-atmospheric pressure within the can, wherefore atmospheric pressure upon the milk within the reservoir 17 is in excess of the pressure within the can, and the latter being in communication with the milk within the reservoir through the pipe 16, such milk is forced by way of the pipe 16 into the passage 6 and from thence against that portion of the perforated head of the can inclosed by the gasket 7 and to the perforation 4, through which latter the milk enters the can in a stream surrounding the tube 10. The first inflow of milk into the can may be in the form of a pronounced stream, but this quickly subsides as a distinct stream as soon as a small quantity of milk has entered the can and spread out to the inner wall thereof, the accumulating quantity of milk within the can resisting the formation of a distinct stream, so that there is simply a lessening of the surface disturbance due to the inflow of milk until by the time the level of the inflowing milk has reached the then upper end of the tube 10 the surface disturbance has very nearly subsided and the surface of the milk is very nearly level.

In practice the perforation 4 need not exceed one-tenth of an inch and is usually of less diameter than one-tenth of an inch and may be quite materially less. It has been found in practice that the tube 10 need not exceed about one-thirtieth of an inch in diameter of its bore, wherefore when the tube 10 has entered the can through the perforation 4 there is ample space between the outer wall of the tube and the wall of the perforation for the inflow of milk. It has been found that if for the baby size can a degree of vacuum be produced within the can corresponding to six or seven inches of the mercury vacuum gage, and if with tall cans which approximate about four and one-half inches, the degree of vacuum be that corresponding to about eleven or twelve inches of the mercury vacuum gage, the milk will flow into the can within a workable period of time up to a level determined by the height of the tube 10 within the can, and as soon as this height is reached the milk will enter the tube 10 and ultimately flow into the receptacle 20, but ordinarily the operation is not continued sufficiently to cause any material flow of milk through the tube 10.

When the can has been filled the chamber member 9 is moved in a direction away from the can, thus permitting the can to settle on to the support 2, the block 5 dropping until the gasket 7 leaves the head 3 of the can, or at least makes very imperfect contact therewith, and finally the chamber member 9 leaves the gasket 8, thus breaking the seal first at the can and then at the gasket 8 and the travel of the member 9 away from the can continues until the tube 10 is wholly withdrawn from the can. The movement of the chambered member 9 away from the can is purposely made a rapid movement, so that the tube may be withdrawn completely from the can without any more than a minute in-drawing of milk into the tube due to a continuance of the exhaustion of the air through the tube 10 during the withdrawing movement. However, there still remains within the space between the surface of the milk and the imperforate head of the can a condition of sub-atmospheric pressure and this causes the indrawing of milk which may be upon the outer surface of the head 3 of the can within the area circumscribed by the gasket 7, by the inrush of air between the gasket 7 and the head of the can to relieve the condition of sub-atmospheric pressure within the can. This may be described as a sucking in of surplus milk between the guide 11 and the perforated head of the can, and practice has demonstrated that this sucking-in action cleanses the head of the can at the perforation so there remains practically no milk at this point to interfere materially with the subsequent soldering operation. Furthermore, the small size of the perforation 4 which, for example, may approximate eighty-nine one-thousandths of an inch in diameter, although by no means limited to any such exact size, prevents spontaneous outflow of milk through the perforation while the can remains in the inverted position, even though the pressure within the can be substantially atmospheric pressure. A condition, whether of capillary attraction between the wall of the perforation and the milk within the can, or surface tension of the milk at the perforation, or both, has been found to be sufficiently pronounced with a perforation of the size stated to prevent any spontaneous outflow of milk under the general conditions prevalent in commercial apparatus with which the present invention may be practised on a large scale. Such an apparatus in shown and described in application No. 664,829, for can filling machine filed by me on December 9, 1911.

Taking as an example the filling of a baby can with evaporated milk with a degree of vacuum corresponding to six or seven inches of the mercury vacuum gage, the inflow of milk, though gentle, is sufficiently rapid under certain conditions to fill the can in about thirty seconds. A higher degree of vacuum may be employed, and a more rapid flow of milk be caused, but the increased flow of milk is liable to produce an effect which may be termed geysering, that is, an uprising of the surface of the milk partly about the tube 10 to an extent which will cause milk to enter the tube before the rising level of the milk has reached the top of the tube, thereby delaying the filling of the can to the proper level. Air will flow through the tube 10 freely, but when milk enters the tube 10 the capillary attraction between the milk and the interior of the tube materially retards the flow of milk therethrough, so that the action is sluggish as compared with the flow of air through the tube. Where it is material that the cans be filled one after the other in like periods of time any pronounced geysering would be fatal to uniformity of filling, for some cans would be filled to the proper level and others, because of the early entrance of milk into the tube 10, would be filled to a considerably lower level and, therefore, there would be considerable variation in the extents to which the cans are filled. This objectionable condition is wholly avoided by so regulating the degree of vacuum that no geysering occurs, and while the time of filling may be prolonged for a few seconds, all the cans will receive like quantities of milk, this being assured by a slight prolongation of the full time of filling to insure equal filling of all cans, since all air tubes 10 and all perforations 4 are not alike.

Figure 4:
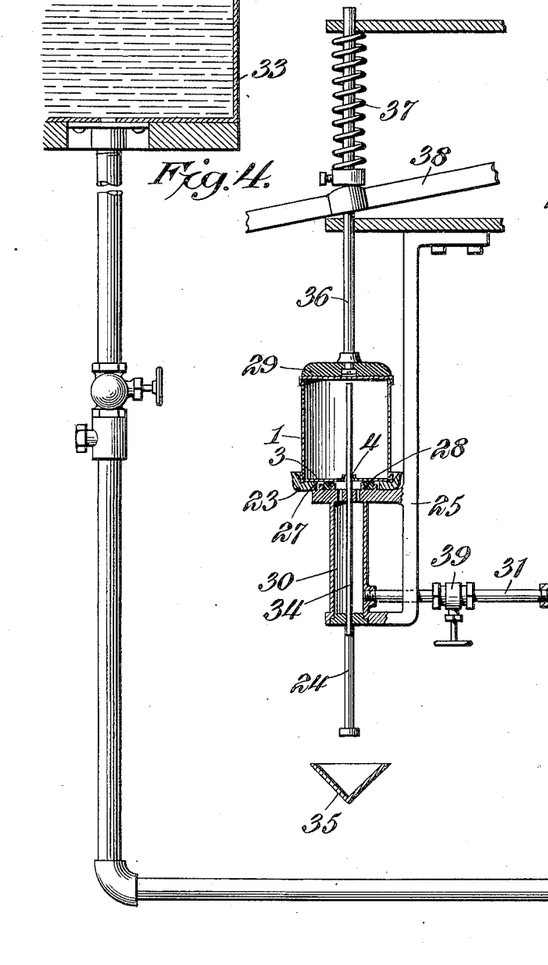
Fig. 4 is a view partly in section and partly in elevation of an apparatus capable of carrying out the invention where super-atmospheric pressure is employed to cause a flow of milk into the can.
Figure 5:
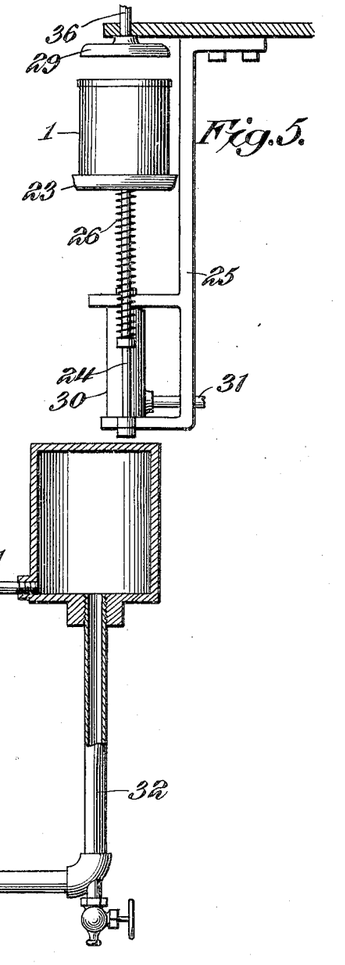
Fig. 5 is an elevation partly in section of a portion of the structure of Fig. 4 showing a different phase of the operation.

Instead of utilizing atmospheric pressure to force the milk into the can by producing sub-atmospheric pressure within the can, super-atmospheric pressure may be employed, in which case the air within the can will flow out. In Figs. 4 and 5 the can 1 is supported upon a table 23 carried by rods 24 guided in a supporting frame 25, these rods being surrounded by springs 26 tending to hold the table 23 in a relatively elevated position. The table 23 has a central passage 27 designed to receive a gasket 28 carried by the support 25 in such position that when the table 23 is lowered by the engagement of a movable follower 29 with the imperforate end of an inverted can lodged on the table, the gasket 28 will engage the then lower perforated head of the can to form an air seal about said perforation. Communicating with the space defined by the gasket 28 is a milk conduit 30 which by means of pipes 31 and 32 is in communication with a milk reservoir 33 sufficiently elevated to establish within the conduit 30 super-atmospheric pressure. Extending through the conduit 30, but out of communication therewith is a tube 34 which has a bore corresponding with the tube 10 of the structure of Figs. 1 and 2. This tube 34 is upright and has its upper end so related to the gasket 28 that when a can is placed upon the table 23 while the latter is elevated and the follower 29 is brought against the can to force it toward the gasket 28, the tube 34 will enter the can through the small perforation 4 therein until the upper end of the tube is close to the imperforate end of the can. Below the lower end of the tube 34 is a receptacle 35 for drip from the tube 34. In the particular structure shown the follower 29 is carried by a supporting rod 36 surrounded by a spring 37 tending to depress the follower while an arm 38 acting on the rod 36 against the spring 37 may be utilized for lifting the follower to permit the table 23 to rise under the action of the spring 26 to a height such that the can clears the tube 34.

When a can is placed upon the table 23 and depressed until the tube 34 enters the can through the perforation 4 to a point close to the imperforate end of the can and milk is allowed to flow to the conduit 30 from the reservoir 33 as by way of a valve 39 in the pipe 31, the milk under pressure reaches the space defined by the gasket 28 about the perforation 4 and enters the can through said perforation, the air within the can at the end thereof remote from the perforation flowing out through the pipe 34. Ultimately the rising level of the milk reaches the upper end of the pipe 34 and milk will begin to drip from the pipe 34, thus indicating to the operator that the can has been filled. Since milk does not flow readily through the pipe 34 because of its capillary size, there is produced adjacent the closed end of the can a condition of super-atmospheric pressure due to the compression of the air by the more rapid inflow of the milk than outflow thereof. If the inflow of milk be now stopped, as by closing the valve 39 and the can remain in the filling position for a short time, the level of milk in the can will soon correspond to the top of the tube 34 due to the further outflow of milk through said tube. Now the follower 29 may be raised, the can also rising because of the action of the spring 26 on the table 23 until the tube 34 is entirely withdrawn from the can, but there is no outflow of milk from the can since the opening 4 is sufficiently capillary in action to prevent such outflow. A filled can may be removed from the table 23 and an empty can substituted, when the operation may be repeated. In the structure shown in Fig. 4 the utilization of gravity to cause the requisite pressure is indicated, but it will be understood that any other means for producing super-atmospheric pressure of the milk at the perforation 4 may be employed. In the structure shown in Fig. 4, as in the structure shown in Fig. 1, the perforation 4 may be considerably smaller than heretofore found necessary, while foaming of the milk is wholly obviated because the milk is filled into the can through the filling perforation, while the can is in the inverted position. The small filling perforation possible in the manner of filling can herein described permits the handling of the cans in the inverted position without any closure whatsoever of the filling perforation, and also greatly facilitates the subsequent closing of the can by a drop of solder after the can has been reinverted so as to bring the perforated end uppermost. The employment of sub-atmospheric pressure within the can has the further advantage of causing a cleansing of the perforation by a sudden sucking in of any small quantity of milk which may be present about the perforation, so that there is no milk present in sufficient quantity to interfere with the subsequent soldering operation, wherefore cleansing of the perforated portion of the can after the filling has been completed, is often not necessary.

A structure wherein cans may be filled on a commercial scale in accordance with the process set forth with respect to Figs. 4 and 5 is disclosed in application No. 634,052 for can filling apparatus filed by me June 19, 1911.

In the structure shown in Figs. 1 and 2 the can remains stationary so far as up and down movement is concerned, except the slight up and down movement due to the travel of the block 5, while the tube 10 is given a sufficient range of movement to be introduced into the inverted can to a point close to the imperforate end thereof or withdrawn wholly from the can.

In the structure shown in Figs. 4 and 5 the tube remains stationary so far as up and down movement is concerned, while the can is given a sufficient range of movement to cause the introduction of the tube into the can to a point close to the imperforate end of the inverted can and the withdrawal of the tube wholly from the can. The air tube, whether a suction tube as in Figs. 1 and 2, or an escape tube as in Fig. 4, is introduced into or withdrawn from the can without regard to whether the can or the tube has bodily movement imparted thereto.

In the structure shown in Figs. 1 and 2 the gasket 8 is made more compressible than the gasket 7, so that on the withdrawing movement of the member 9 and tube 10 the sub-atmospheric pressure will cause a clinging together of the member 9, block 5, and can 1 until the can is brought into engagement with the support 2, and the gasket 7 being less compressible than the gasket 8 will move out of engagement or into a condition of poor engagement with the perforated head of the can before the seal between the member 9 and the gasket 8 has been materially disturbed, wherefore there is an inrush of air to equalize pressures between the perforated head of the can and the gasket 7, and the action of gravity on the column of milk within the tube 16 causes a flow of any milk which may be in the passage 6 into said tube, and ultimately into the reservoir 17, so that when the contact between the member 9 and the gasket 8 is finally broken, but a minute quantity of milk still remains in the passage 6 to flow over the member 9 and ultimately drop into the reservoir 17. Consequently there is very little drip which, however, is not wasted because it finds its way into the reservoir 17 to be again directed into the passage 6 and ultimately into another can 1.

In practice on a commercial scale the suction apparatus is worked continuously, so that there is always a suction produced in the tube 10 whether it be within the can or withdrawn therefrom, and this suction serves to clear the tube of any milk which may find its way into said tube in the interval between the withdrawal of the tube from a filled can and the placing of an empty can in position to receive the tube. The employment of subatmospheric pressure or suction to cause the milk to flow into the can, in addition to preventing waste of milk in the absence of a can, has the further advantage of preventing the flow of milk into a properly placed can should such can be leaky as sometimes occurs. Under such circumstances the requisite lowering of pressure within the can is not brought about, being prevented by the inrush of air at the leak or leaks, wherefore milk is not drawn into the can and at the expiration of the filling period the can will still remain empty, thus preventing leakage of milk from a filled defective can. By the provision of cans each with a single small filling perforation in one end of a size to prevent the spontaneous outflow of liquid therefrom when the can is inverted, and by providing for the overflow of air from the interior of the can through an air tube, it is possible to fill the can while the latter is inverted within such a time period as is necessary to make the process commercially successful, since a very minute air tube may be employed and a correspondingly minute perforation may be provided in the can. This is possible because air will readily flow through a passageway far smaller than that through which a like flow of liquid could be produced. Practice has demonstrated that so small a perforation may be employed that the sealing of the perforation can be accomplished with certainty by the use of a single small drop of solder without liability of the solder passing into the can in the form of shot or failing to effectively close the perforation.

What is claimed is:—

1. The process of causing liquids which consists in first providing cans each with a single small filling perforation in one end of a size to prevent spontaneous outflow of liquid from the can when the latter is in the inverted position and the can being otherwise completely sealed, supporting the can in the inverted position with the perforated end downward, introducing into the can through the small perforation a tube of capillary size to a point adjacent the then upper or imperforate end of the can, applying a liquid duct to the perforated end of the can about said perforation in fluid tight relation thereto, then causing a propelling pressure upon the liquid to force it into the can through the small perforation about the tube introduced therethrough and continuing said pressure until the can is filled to the desired level, then causing a relative movement of the tube and can while the latter is still inverted to carry the tube entirely outside the can and leaving the perforation open, then reinverting the can to bring the perforation uppermost, and then sealing the perforation.

2. The process of canning liquids consisting in providing cans each with a single small perforation in one end of a size to prevent spontaneous outflow of liquid from the can when the latter is in the inverted position and the can being otherwise completely sealed, supporting the can with the perforated end downward, introducing into the can through the small perforation while the can is in the inverted position a tube of capillary size with the end of the tube within the can adjacent the imperforate end of said can, then causing an inflow of liquid into the can through the small perforation about the tube and an outflow of air from the can through said tube, and then withdrawing the tube from the can leaving the perforation still in the open condition and the can still inverted.

3. The process of canning liquids consisting in providing cans each with a single small perforation in one end of a diameter to prevent the spontaneous outflow of liquid from the can when the can is in the inverted position and the can being otherwise completely sealed, supporting the can in the inverted position with the perforated end downward, introducing into the can through the small perforation while the can is in the inverted position a tube of capillary size until the end of the tube is adjacent the imperforate end of the can, causing an inflow of liquid into the inverted can through the small perforation about the tube, and an outflow of air from the can through said tube, then causing a relative movement of the can and tube while the can is still inverted to carry the tube wholly outside the can, then restoring the can to the uninverted position, and then sealing the perforation by a drop of solder.

4. The process of canning liquids which consists in providing cans each with a small filling perforation in one end of a size to prevent spontaneous outflow of liquid from the can when in the inverted position, and with the can otherwise sealed, supporting the can in the inverted position with the perforated end downward, and producing within the can a condition of sub-atmospheric pressure and simultaneously causing an inflow of liquid into the inverted can through the small filling perforation, and maintaining said condition of sub-atmospheric pressure within the can substantially constant until the filling of the can is completed.

5. The process of canning liquids which consists in providing cans each with a single small filling perforation in one end of a size to prevent spontaneous outflow of liquid from the can when in the inverted position, and the can being otherwise sealed, placing the can in the inverted position with the perforated end downward, introducing an active air suction tube into the can through the perforation to a point adjacent to but spaced from the imperforated end of the inverted can, and bringing a liquid conduit into air sealing relation to the perforated end of the can about the perforation to thereby cause subatmospheric conditions within the can productive of the flow of liquid into the can through the liquid conduit.

6. The process of canning liquids consisting in providing a can with a single small filling perforation in one end of a size to prevent spontaneous outflow of liquid therethrough when the can is inverted and the can being otherwise sealed, supporting the can in the inverted position with the perforated end downward, introducing a tube of capillary size in an upward direction into the inverted can through the perforation to a point adjacent to the imperforate end of the can, establishing a connection with a source of liquid supply in liquid tight relation to the perforated end of the can about such perforation and the tube entering the can, and producing subatmospheric conditions within the can by withdrawing air from the can by suction through the small tube introduced thereinto to cause an inflow of liquid through the filling perforation.

7. The process of filling a can with liquid through a single small perforation in one end of the can while the can is inverted with the filling perforation downward and said perforation being of a size to prevent spontaneous outflow of liquid through the perforation while the can is inverted, consisting in introducing a tube of capillary size into the can through the perforation in the inverted can to a point adjacent the imperforate end of the can, establishing a connection with a source of liquid supply in liquid tight relation to the perforated end of the can about said perforation and the tube entering the can, producing sub-atmospheric conditions within the can by withdrawing the air from the can by suction through the small tube introduced thereinto to cause an inflow of liquid through the filling perforation, and then withdrawing the small tube from the can and breaking the liquid tight connection with the liquid conduit to cause an indrawing of surplus liquid about the filling perforation by the equalizing of pressures within and without the can.

8. The process of canning liquids consisting in providing a can having a single filling perforation of a size to prevent spontaneous outflow of liquid from the can when inverted and the can being otherwise sealed, supporting the can in the inverted position with the filling perforation downward, introducing a tube of capillary size into the can through the perforation to a point adjacent the imperforate end of the inverted can, producing at the perforated end of the inverted can liquid tight relation with a liquid conduit within a circumscribed area about the perforation, drawing air by suction from the interior of the can through the tube introduced thereinto and thereby causing an inflow of liquid by way of the conduit to and through the filling perforation about the tube until the level of liquid in the can reaches that end of the tube adjacent the imperforate end of the can, and then rapidly removing the tube from the can and at the same time breaking the liquid tight connection between the can and liquid conduit to cause an indrawing of surplus liquid about the perforation through said perforation by the equalization of pressures within and without the can.

9. The process of canning liquids which consists in providing a can having a single filling perforation of a size to prevent spontaneous outflow of liquid therethrough when the can is inverted and said can being otherwise sealed, supporting the can with the perforated end downward introducing into the inverted can through the small filling perforation a tube of capillary size to a point adjacent the imperforate end of the inverted can, establishing a liquid tight relation between the perforated end of the inverted can and a liquid conduit within a circumscribed area about the perforation, withdrawing air continuously by suction through the tube from the interior of the can to cause an inflow of liquid by way of the conduit to and through the filling perforation about the tube until the level of liquid reaches the end of the tube within the can, then rapidly removing the tube from the can and at the same time breaking the liquid tight connection with the liquid conduit to cause indrawing of surplus liquid about the filling perforation through the latter by the equalization of pressures within and without the can.

10. The process of canning liquids which consists in providing a can having a single small filling perforation in one end of a size to prevent spontaneous outflow of liquid from the can through a perforation when the can is inverted, and said can being otherwise sealed, supporting the can in the inverted position with the perforation downward, introducing a suction tube into the inverted can through the perforation to a point adjacent the imperforate end of the can, the suction conditions being established before the tube is introduced into the can and maintained continuously while the tube is in the can, directing liquid to the perforation in the can by atmospheric pressure because of the production of sub-atmospheric pressure within the can by the suction tube, and continuing the sub-atmospheric conditions within the can until the liquid introduced into the can overflows into the suction tube.

11. The process of canning liquids which consists in providing a can having a single small filling perforation in one end of a size to prevent outflow of liquid therethrough when the can is inverted, and said can being otherwise sealed, supporting the can in the inverted position with the filling perforation downward, establishing and maintaining sub-atmospheric conditions within the can while in the inverted position by continuously withdrawing air from the can through the filling perforation by suction, causing the inflow of liquid into the can through the filling perforation by the maintenance of the sub-atmospheric conditions within the can, and then causing the indrawing of surplus liquid about the filling perforation at the completion of the filling operation by the reëstablishment of atmospheric conditions within the can.

12. The process of canning liquids which consists in providing a can having a single filling perforation in one end of a size to prevent spontaneous outflow of liquid therethrough when the can is inverted and said can being otherwise sealed, supporting the can in the inverted position with the filling perforation downward, establishing sub-atmospheric conditions within the can while inverted and directing liquid into the inverted can through the filling perforation while the sub-atmospheric conditions within the can are maintained, and until the filling operation is completed, then reëstablishing normal conditions within the can, then reinverting the can to bring the filling perforation upward, and then closing the filling perforation with sealing material.

13. The process of canning liquids consisting in providing a can having a single small filling perforation in one end of a size to prevent spontaneous outflow of liquid from the can when the latter is inverted, said can being otherwise sealed, supporting the can in an inverted position with the perforated end downward, introducing into the can through the filling perforation a tube of capillary size, establishing air tight connections between a liquid conduit and the lower end of the can about the perforation and also in the liquid conduit in spaced relation to the can, establishing sub-atmospheric conditions within the can to cause an inflow of liquid through the conduit into the can through the small perforation and maintaining said sub-atmospheric conditions until the filling is completed, and then breaking the air tight connections first at the can and then at the point spaced from the can.

14. The process of filling an inverted can with liquid through a single filling perforation in the then lower end of the can consisting in establishing air tight connections between a liquid conduit and the then lower end of the can about the filling perforation and also at a point in the liquid conduit spaced from the can, then establishing and maintaining sub-atmospheric conditions within the can to cause a flow of liquid through the conduit into the can until the filling operation is completed, and then breaking the air tight connections first at the can and then at the point in spaced relation thereto to cause an indrawing of liquid about the filling perforation through the same into the can by the reëstablishment of atmospheric conditions within the can and the subsequent lowering of the liquid in the conduit because of the break in the air tight connections spaced from the can.

15. The process of filling cans with liquid which consists in inverting cans each with one head imperforate and the other head provided with a single small perforation of a size to prevent spontaneous outflow of liquid from a filled can when the perforated head is downward, then sealing a duct for the liquid to be filled into the can to the perforated head of the inverted can about the perforation and withdrawing air from the interior of the can from a level approximating that to which the can is to be filled, and then removing the liquid duct from sealed relation to the then lower end of the can while the latter is still in the inverted position and the perforation is freely open.

16. The process of filling cans with liquid which consists in inverting cans each with one head imperforate and the other head provided with a single small perforation of a size to prevent spontaneous outflow of liquid from the filled can when the perforated head is downward, introducing an air tube into the can through the small perforation in the then lower head of the can to a level approximating that to which the can is to be filled, the air tube being at the time of introduction into the can actively connected to an air suction means, and then causing the withdrawal of air from the can and the flow of liquid into the can through the small perforation by sealing a duct for the liquid to the then lower end of the can about the small perforation, and then breaking the seal between the liquid conveying duct and the perforated head of the can while sub-atmospheric pressure still prevails within the can.

17. The process of canning liquids which consists in providing cans each with one head imperforate and the other head provided with a single small perforation of a size to prevent the spontaneous outflow of liquid from a filled can through the small perforation when the perforated head of the can is downward, inverting the can to bring the perforated head downward, introducing an air suction tube into the can through the perforation in the then lower head to a level approximating that to which the can is to be filled, said air suction tube being in active communication with means for withdrawing air from the can through it, sealing a liquid conveying duct to the perforated end of the can about the perforation and thereby causing the production of sub-atmospheric conditions within the can and the consequent flow of liquid into the can through the duct, and then withdrawing the air tube from the can and breaking the seal between the liquid conveying duct and the can while sub-atmospheric conditions still prevail within the can.

18. The process of canning liquids which consists in providing cans each with a single small filling perforation in one end only and of a size to prevent the spontaneous outflow of liquid from the filled can when inverted, placing the can in the inverted position with the perforated head downward, then causing sub-atmospheric conditions within the can to produce a flow of liquid into the can by the action of atmospheric pressure, and finally causing the restoration of equilibrium of atmospheric pressure between the interior and exterior of the can at the completion of the filling operation and while the can is still inverted and the perforation is freely open.

19. The process of filling liquid into cans each of which is provided with a single small filling perforation in one head of a size to prevent spontaneous outflow of liquid from the filled can when inverted, which consists in placing the cans in the inverted position with the perforated head downward, then establishing subatmospheric conditions within the inverted can to cause liquid to flow thereinto through the small perforation, the subatmospheric conditions being maintained throughout the filling operation, and then establishing an equilibrium of atmospheric pressure within and without the can through the perforation while the can is still in the inverted position and the perforation is freely open.

In testimony, that I claim the foregoing as my own, I have hereto affixed my signature in the presence of two witnesses.

WALTER J. PHELPS.

Witnesses:
 JOHN H. SIGGERS,
 DAVID R. WAGNER.